(12) United States Patent
Ratiner et al.

(10) Patent No.: US 12,099,611 B2
(45) Date of Patent: Sep. 24, 2024

(54) SYSTEM AND METHOD FOR SECURING ELECTRONIC DEVICES

(71) Applicants: Michael Ratiner, Rishon Lezion (IL); Dan Eliav, Zichron Yaakov (IL)

(72) Inventors: Michael Ratiner, Rishon Lezion (IL); Dan Eliav, Zichron Yaakov (IL)

(*) Notice: Subject to any disclaimer, the term of this patent is extended or adjusted under 35 U.S.C. 154(b) by 253 days.

(21) Appl. No.: 17/623,025

(22) PCT Filed: Jun. 24, 2020

(86) PCT No.: PCT/IL2020/050706
§ 371 (c)(1),
(2) Date: Dec. 27, 2021

(87) PCT Pub. No.: WO2020/261271
PCT Pub. Date: Dec. 30, 2020

(65) Prior Publication Data
US 2022/0269787 A1    Aug. 25, 2022

(30) Foreign Application Priority Data
Jun. 24, 2019   (IL) .......................................... 267619

(51) Int. Cl.
*G06F 15/16*      (2006.01)
*G06F 21/57*      (2013.01)

(52) U.S. Cl.
CPC ...... *G06F 21/572* (2013.01); *G06F 2221/034* (2013.01)

(58) Field of Classification Search
CPC ........ G06F 21/572; G06F 21/76; G06F 21/54; G06F 21/554; G06F 2221/034
See application file for complete search history.

(56) References Cited

U.S. PATENT DOCUMENTS 10,366,378 B1 *   7/2019  Han ..................... G06Q 20/204
11,018,694 B2 *   5/2021  Gravel ............. H03M 13/6502
(Continued)

FOREIGN PATENT DOCUMENTS

CA    3051393 A1 *   1/2018  ......... G06F 16/1834
CN    103246842 A  *   8/2013  ............. G06F 21/10
(Continued)

OTHER PUBLICATIONS

Trimberger Stephen M. et al.: "FPGA Security: Motivations, Features, and Applications", Proceedings of the IEEE, IEEE. New York, US, vol. 102, No. 8, pp. 1248-1265, Aug. 8, 2014.

*Primary Examiner* — Richard G Keehn
(74) *Attorney, Agent, or Firm* — BROWDY AND NEIMARK, P.L.L.C.

(57) ABSTRACT

The present invention discloses a system for authenticating and securing message/instruction transmission, including a hardware processing unit for testing the validity of original message or derivative of the original message by running specific firmware code resulting first test results, a software processing unit, for testing the validity of the original message or derivative of the original message by running specific software code, for resulting a second test result, and a logic comparison module, for comparing between the first and the second test results, wherein the comparison authenticates the message. The testing is performed simultaneously at the hardware processing unit and the software processing unit. According to some embodiments of the present invention the logic comparison module is implemented as a hardware module including a gates array including at least one logic gate.

14 Claims, 16 Drawing Sheets

(56) References Cited

U.S. PATENT DOCUMENTS

| | | | |
|---|---|---|---|
| 11,882,117 B1* | 1/2024 | Kumar | H04L 63/0853 |
| 2006/0280150 A1 | 12/2006 | Jha et al. | |
| 2008/0130893 A1* | 6/2008 | Ibrahim | G06F 21/572 |
| | | | 380/277 |
| 2013/0079153 A1* | 3/2013 | Crowder, Jr. | G07F 17/32 |
| | | | 463/42 |
| 2013/0346814 A1 | 12/2013 | Zadigian et al. | |
| 2017/0310684 A1 | 10/2017 | Wagner et al. | |
| 2018/0048474 A1 | 2/2018 | Landrock et al. | |
| 2019/0042475 A1* | 2/2019 | Ghosh | H04L 9/0643 |
| 2019/0049912 A1 | 2/2019 | Poornachandran et al. | |
| 2019/0268318 A1* | 8/2019 | Tsirkin | G06F 21/44 |
| 2020/0218597 A1* | 7/2020 | Itkin | G06F 12/0895 |

FOREIGN PATENT DOCUMENTS

| | | | | |
|---|---|---|---|---|
| CN | 104486169 A | | 4/2015 | |
| CN | 111625295 A | * | 9/2020 | |
| CN | 110001553 B | * | 7/2021 | B60R 16/0232 |
| EP | 1407339 A2 | | 4/2004 | |
| FR | 3076679 A1 | * | 7/2019 | B64D 45/00 |
| KR | 20100055147 A | | 5/2010 | |
| WO | WO-2011119985 A2 | * | 9/2011 | G06F 21/575 |
| WO | WO-2016092318 A1 | * | 6/2016 | G06Q 20/351 |

\* cited by examiner

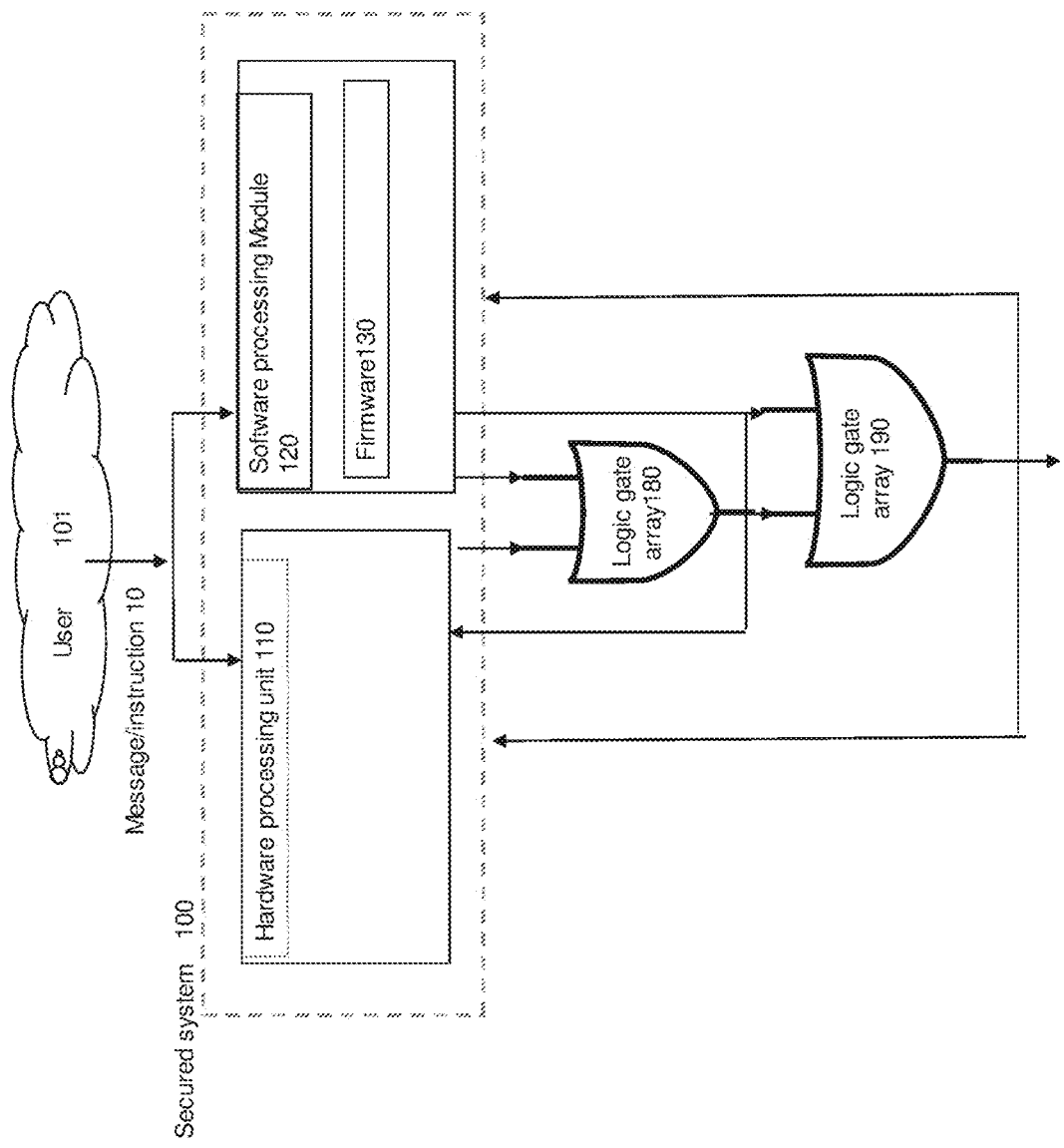

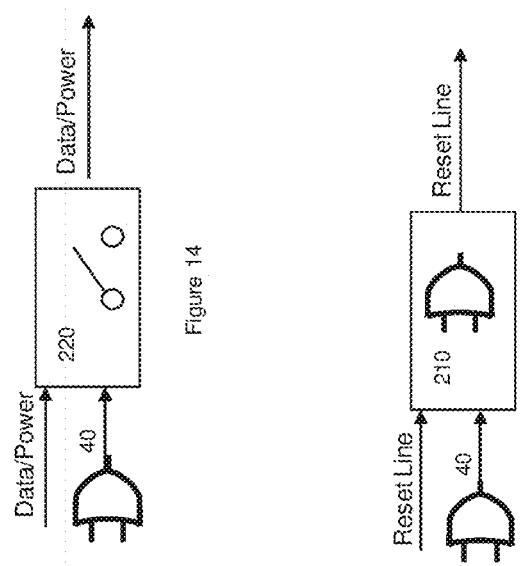
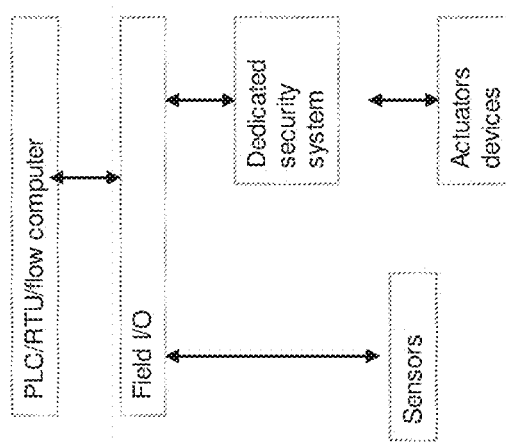
Figure 14
Figure 15
Figure 13

SYSTEM AND METHOD FOR SECURING ELECTRONIC DEVICES

FIELD OF THE INVENTION

The present invention generally relates to the field of data security in embedded computing systems, and more specifically to the architecture of hardware-based security solutions for embedded systems.

BACKGROUND

Software is the weakest link in the security schemes, as they may contain bugs and may be patched by hackers. At the same time, a good security scheme can't be built without software, as Hardware is static, hence its configuration is predetermined. and can't be updated.

The communication protocol also plays an important role in security schemes. It makes no sense to build a strong security mechanism on the end-nodes of the network or on the server where the information is sent in an open manner or using a weak protocol.

In the present invention we add information to the protocol which can't be changed or replaced without the ability to determine the fact of change/replacement. Secondly, we share software and hardware in our security mechanism in a manner that makes it impossible to remotely modify software without the ability to determine this fact.

SUMMARY OF THE INVENTION

The present invention provides a system for authenticating securing message/instruction transmission according to an authorization level, system comprising:
  a. a hardware processing unit for testing an original message or derivative of said original message by running specific firmware code resulting first test results;
  b. a software processing unit, for testing the original message or derivative of said original message by running specific software code; for resulting a second test result;
  c. a logic comparison hardware module, for comparing between the first and second test results, wherein said comparison authenticate said message.

According to some embodiments of the present invention said logic comparison hardware module is comprised of array of at least one logic gate.

According to some embodiments of the present invention said logic comparison hardware module is implemented as a processing unit According to some embodiments of the present invention the hardware processing unit include a firmware and a memory, wherein the hardware processing is executed based on instruction in the firmware and memory modules According to some embodiments of the present invention the original message is split into two messages. wherein a first message is directed to software logic unit and a second messages is directed to the hardware processing unit.

According to some embodiments of the present invention the hardware processing unit is implemented an Application-Specific hardware as at least one of: FPGA, ASIC.

According to some embodiments of the present invention the system further comprising a second logic gate component, for receiving the outcome of the first logic hardware component and sending feed back to the software processing unit, wherein the feedback enables resetting operation on the software processing unit.

According to some embodiments of the present invention the system further comprising a second logic gate component Identifying malfunction is case the results from the software module is not compliant with hardware module.

According to some embodiments of the present invention the message to software processing module includes an encrypted message B and encrypted CRC or HASH C of plain original message and the Software Processing Unit sends the encrypted message B to Hardware Processing Unit where the Processing Unit sends also encrypted CRC (or HASH) Processing the encrypted message B by applying set of instructions at the hardware processing module.

According to some embodiments of the present invention security elements are initialized and activated at different stages of design, manufacture and execution, wherein non-configurable hardware element remains unchanged throughout the life circle after design and manufacture and Software, also, can be initialized on different operation stages According to some embodiments of the present invention the ASIC initialization is performed only on manufacturing stage.

According to some embodiments of the present invention the microprocessor initialization is performed in operational (exploitation) stage.

The present invention discloses a system for authenticating and securing message/instruction transmission, system comprising:
  a hardware processing unit for testing the validity of a nonrandom original message or derivative of said original message by running specific firmware code resulting first test results;
  a software processing unit, for testing the validity of the nonrandom original message or derivative of said original message by running specific software code; for resulting a second test result;
  a logic comparison module, for comparing between the first and the second test results, wherein said comparison authenticate said message.

Wherein the testing is performed simultaneously at the hardware processing unit and the software processing unit; According to some embodiments of the present invention said logic comparison module is implemented as a hardware module comprising a gates array including at least one logic gate According to some embodiments of the present invention said logic comparison module is implemented as a processing unit.

According to some embodiments of the present invention the hardware processing unit includes a firmware and a memory, wherein the hardware processing is executed based on instructions in the firmware and memory modules.

According to some embodiments of the present invention the original message is split into two messages, wherein a first message is directed to software processing unit and a second message is directed to the hardware processing unit.

According to some embodiments of the present invention the hardware processing unit is implemented as Application-Specific hardware.

According to some embodiments of the present invention the system further comprising a second logic comparison hardware module, for receiving the outcome of the first logic comparison module and sending feedback to the software processing unit, wherein the feedback enables resetting operation on the software processing unit.

According to some embodiments of the present invention message to the software processing module includes an encrypted message B and encrypted CRC or HASH C of a plain original message and the Software Processing Unit sends the encrypted message B to the Hardware Processing Unit where the Software Processing Unit sends also encrypted CRC or HASH to the logic comparison module. Hardware Processing unit calculates encrypted CRC or HASH X by the encrypted message B and by applying set of instructions and sends result value X to the logic comparison module.

According to some embodiments of the present invention the security elements are initialized and activated at different stages of design, manufacture and execution, wherein non-configurable hardware element remains unchanged throughout the life circle after design and manufacture and software element, also, can be initialized on different operation stages.

According to some embodiments of the present invention the initialization of the hardware processing unit is performed only on manufacturing stage.

According to some embodiments of the present invention the initialization of the software processing unit is performed only in operational (exploitation) stage.

According to some embodiments of the present invention the testing at the hardware module and software modules are performed in real time.

BRIEF DESCRIPTION OF THE DRAWINGS

FIG. 6 presents a schematic block diagram and flow of the secured system in including resetting option according to one embodiment of the present invention.

FIG. 13 presents a schematic block diagram illustrating an example of integrating the secured system within factory infrastructure according to one embodiment of the present invention FIG. 14 presents a schematic block diagram illustrating an example of integrating the secured system within processing unit according to one embodiment of the present invention.

FIG. 15 presents a schematic block diagram illustrating an example of integrating the secured system within processing unit as reset line, according to one embodiment of the present invention.

DETAILED DESCRIPTION OF SOME EMBODIMENTS OF THE INVENTION

Figure 1:
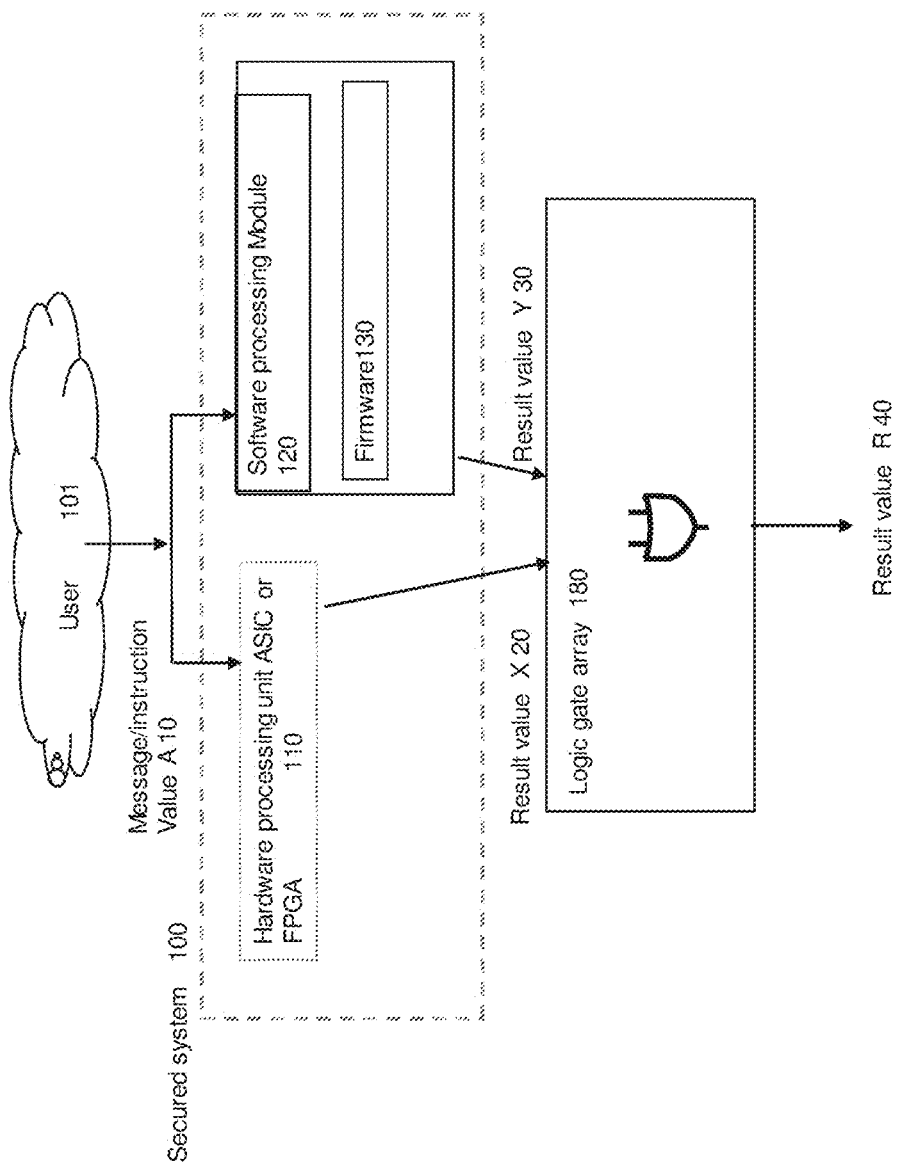
FIG. 1 presents a schematic block diagram and flow of the secured system according to one embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application.

The present invention provides a security of embedded system composed of several components, such as separated execution environment, crypto-processor, security memory and communication protocol. Each of these components solves certain weakness, their combination creates reliable security system.

One of the security design principles is the need to design as security system in which the different security elements are initialized and activated at different stages of design, manufacture and execution. For example, non-configurable hardware element remains unchanged throughout the life circle after design and manufacture. End-user can't change such type of element, or part of it. Software allows to use configurable hardware elements. Such elements can be configured by end-user, and they are unique for each user or group of users. Software solutions are very flexible, as they allow to change not only configuration parameters, but also algorithms executable instructions. Software, also, can be initialized on different operation stages. For example, crypto-algorithms can be implemented on FPGA or ASIC or on any other Application-Specific Hardware at manufacture stage. Secret keys can be stored in the protected memory by end-user.

The present invention discloses a system, which is configured to implement "security as an embedded service"; a term that is utilized to describe a Software Execution Environment (SEE) that is embedded in hardware architecture, and provides built-in, multiple levels of data protection and security controls.

The present invention addresses the security needs of a wide range of devices, intended for deployment by various types of consumers, including for example devices employed for industrial, military or medical applications.

According to one aspect of the system presented herein, the system is comprised of separate hardware modules, FIG. 1 presents a schematic block diagram and flow of the secured system according to one embodiment of the present invention.

The secured system 100 is comprised of Hardware processing unit 110 and Software processing Module 120, which receive the same user nonrandom message/instruction 10 to be validated. The Hardware processing unit 110 which can be implemented as ASIC or FPGA process the received message or instruction and results outcome X, at the same time the software processing unit 120 process the same message instruction by firmware 130 and results outcome Y. The two outcomes are compared by hardware logic array 180 which comprised of at least one hardware logic gate, the comparison result R, provide indication of the message/instruction validation, for example true/false parameter (1/0). The comparison may be a simple AND gate which identifies if the results are identical, or any array of logic gates which identifies logic relation between the results. Hardware processing unit 110 and Software processing Module 120 may be untrusted modules.

According to some embodiments of the present invention, the logic gates be implemented as integrated circuit.

Figure 2:
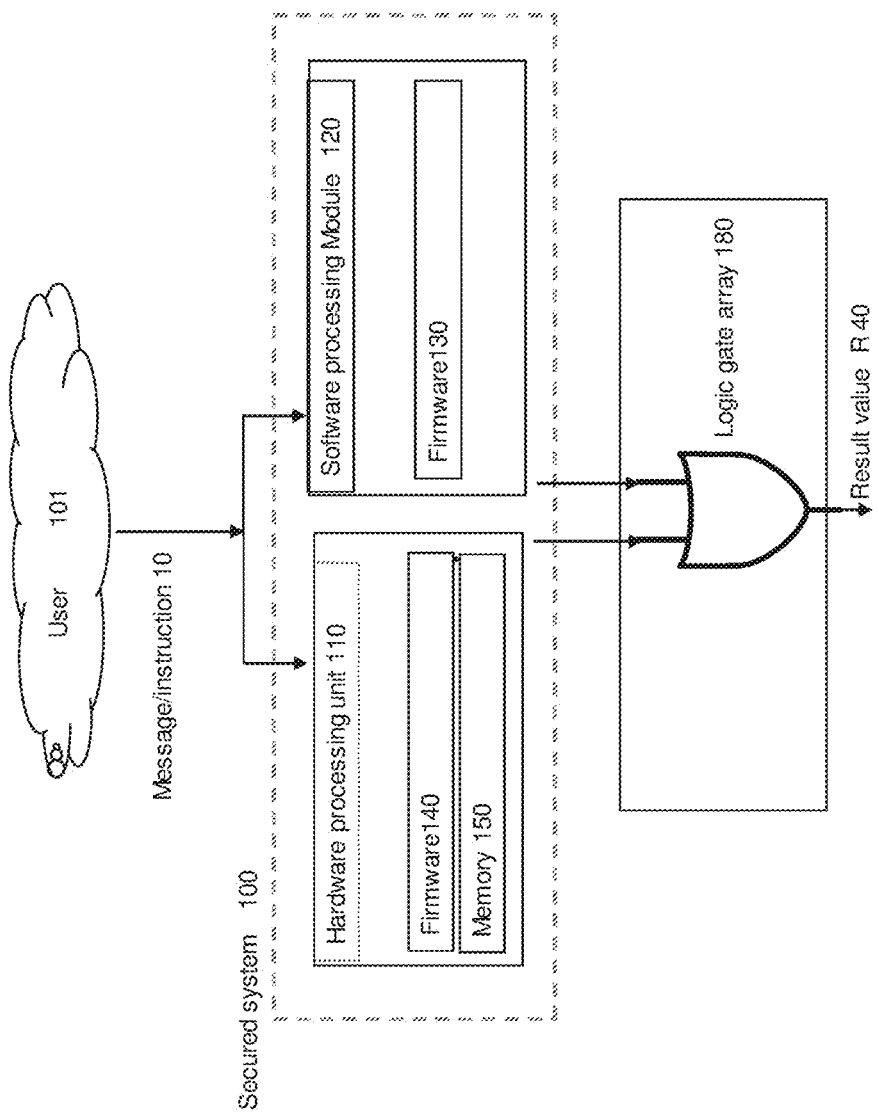
FIG. 2 presents a schematic block diagram and flow of the secured system according to one embodiment of the present invention.

FIG. 2 presents a schematic block diagram and flow of the secured system according to one embodiment of the present invention.

According to this embodiment, the hardware processing unit include a firmware 140 and a memory 150. The hardware processing is executed based on instruction in the firmware and memory module. The access to these modules is protected.

Figure 3:
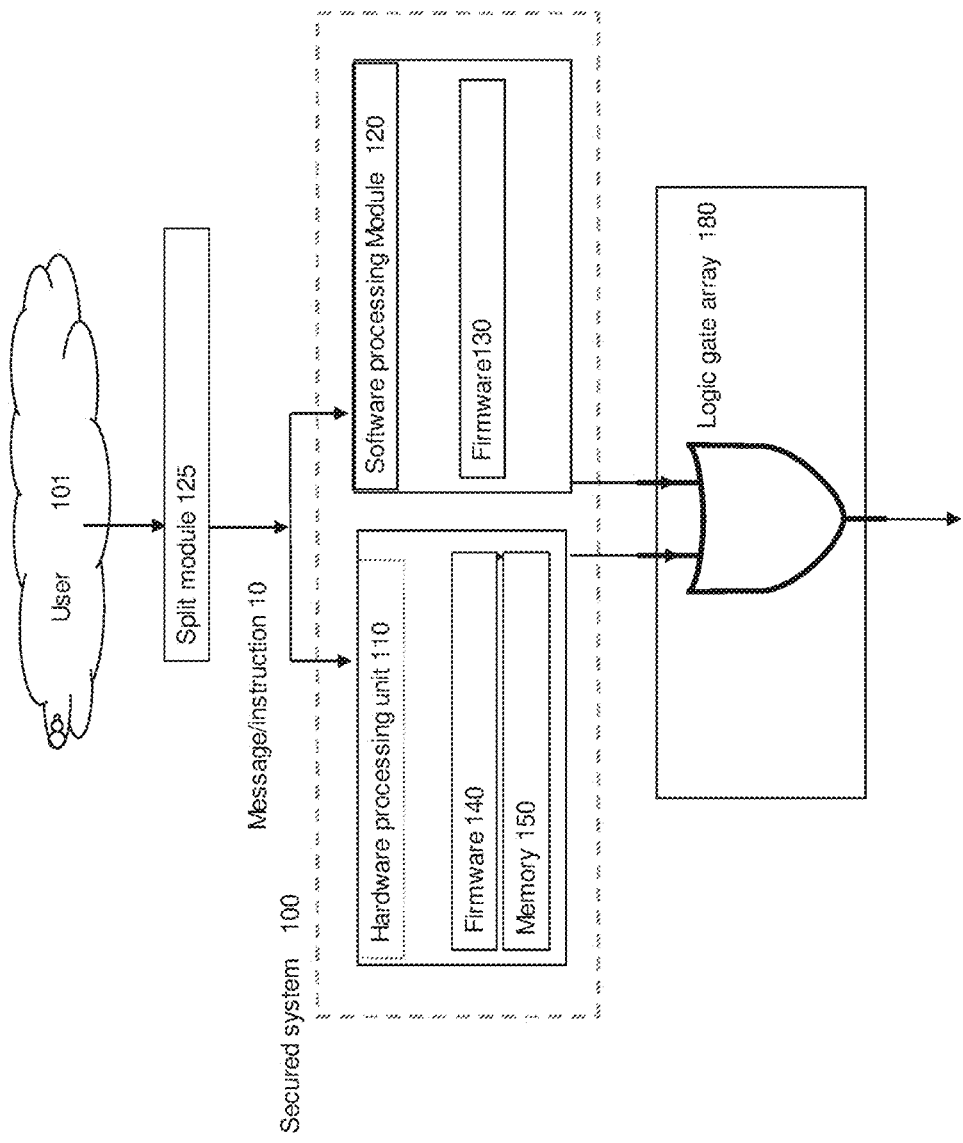
FIG. 3 presents a schematic block diagram and flow, including splitting algorithm, according to some embodiments of the present invention.

FIG. 3 presents a schematic block diagram and flow, including splitting algorithm, according to some embodiments of the present invention.

According to this embodiment the security system further includes a splitting module 120, which split the original user message into two different messages, one conveyed to the software processing unit and another conveyed to the hardware processing unit.

Figure 4:
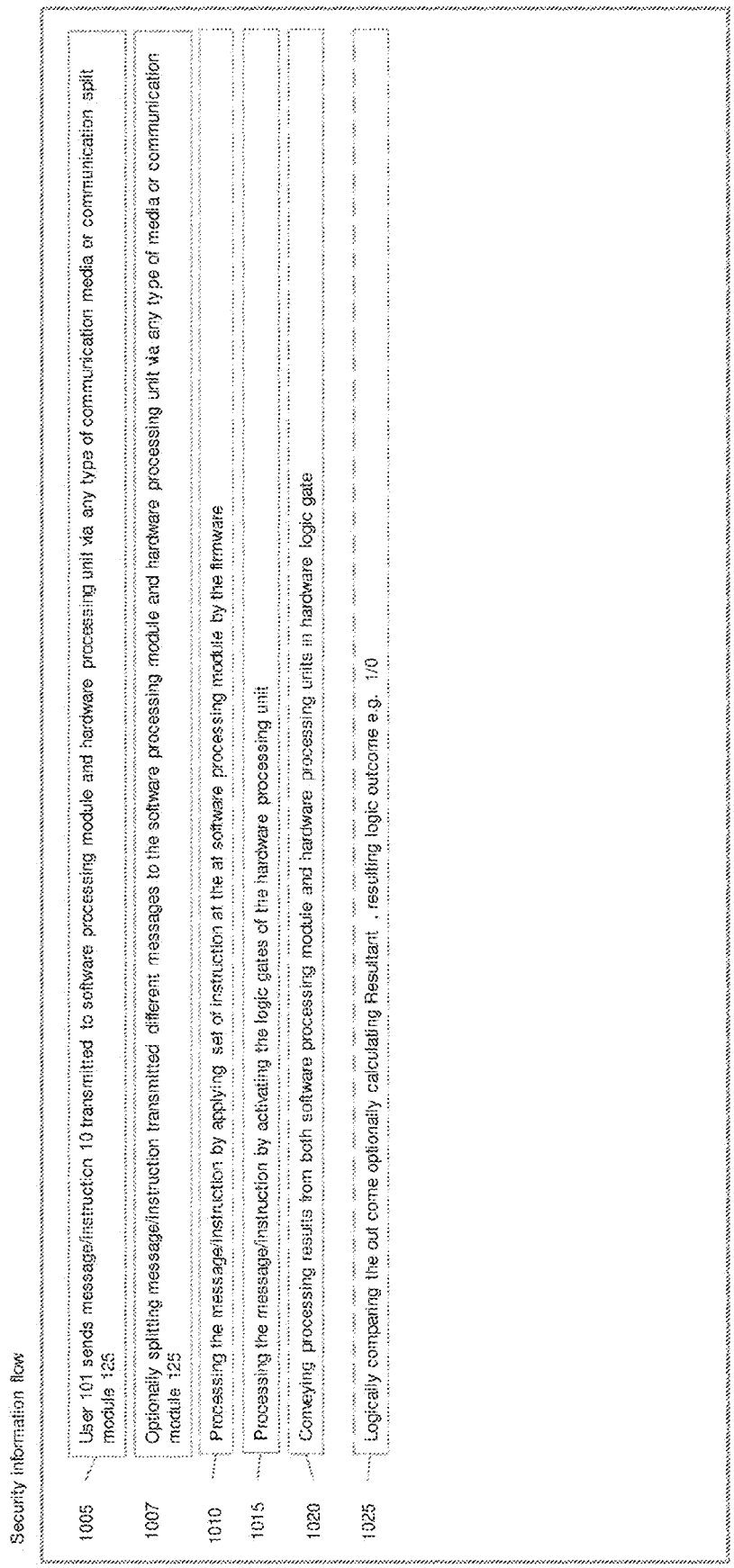
FIG. 4 presents a flow diagram, of the security process of, according to one embodiment of the present invention.

FIG. 4 presents a flow diagram, of the security process of, according to one embodiment of the present invention.

The flow of the security process according to this embodiment includes the following steps:

User 101 sends non random message/instruction 10 transmitted to software processing module and hardware processing unit via any type of media or communication split module 125 (1005).

Optionally the message/instruction is split, transmitting different messages to the software processing module and hardware processing unit via any type of media or communication module splitting 125. (1007)

The system simultaneously in real time processes the message/instruction by applying set of instructions at the at software processing module by the firmware (1010) and processing the message/instruction by activating the logic gates of the hardware processing unit (1015).

The results from both software processing module and hardware processing are conveyed to hardware logic gate unit. (1020).

At this unit the results are logically compared, the comparison, resulting logic outcome e.g. 1/0. Optionally the outcome is calculating Resultant. (1025)

Figure 5A:
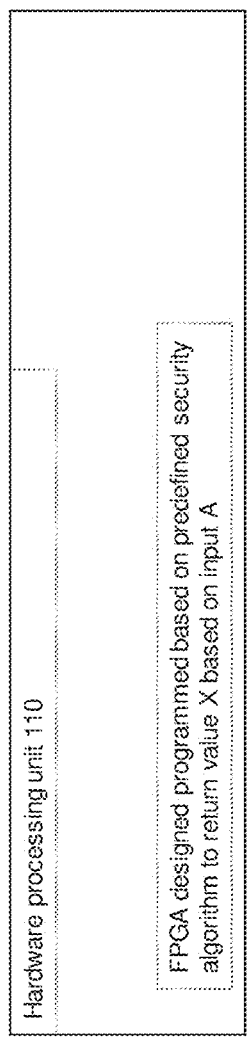
FIG. 5 presents a schematic block of the hardware implementation, of the hardware processing unit, according to some embodiments of the present invention.
Figure 5B:
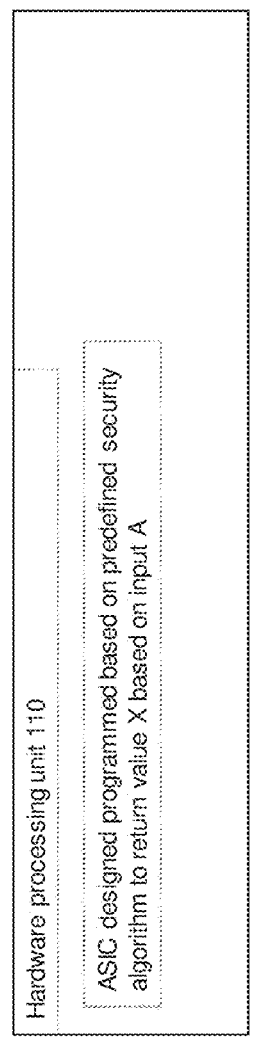

FIG. 5 presents a schematic block of the hardware implementation, of the hardware unit according to some embodiments of the present invention.

One implementation of the hardware processing unit is of FPGA designed programmed based on predefined security algorithm to return value X based on input A.

A second implementation of the hardware processing unit is of an ASIC unit design programmed based on predefined security algorithm to return value X based on input A FIG. 6 presents a schematic block diagram and flow of the secured system in including resetting option according to one embodiment of the present invention.

According to this embodiment, the system further comprises two logic gates components, where the second logic gate component is designed to provide feedback to the software processing unit, enabling reset options.

Figure 7:
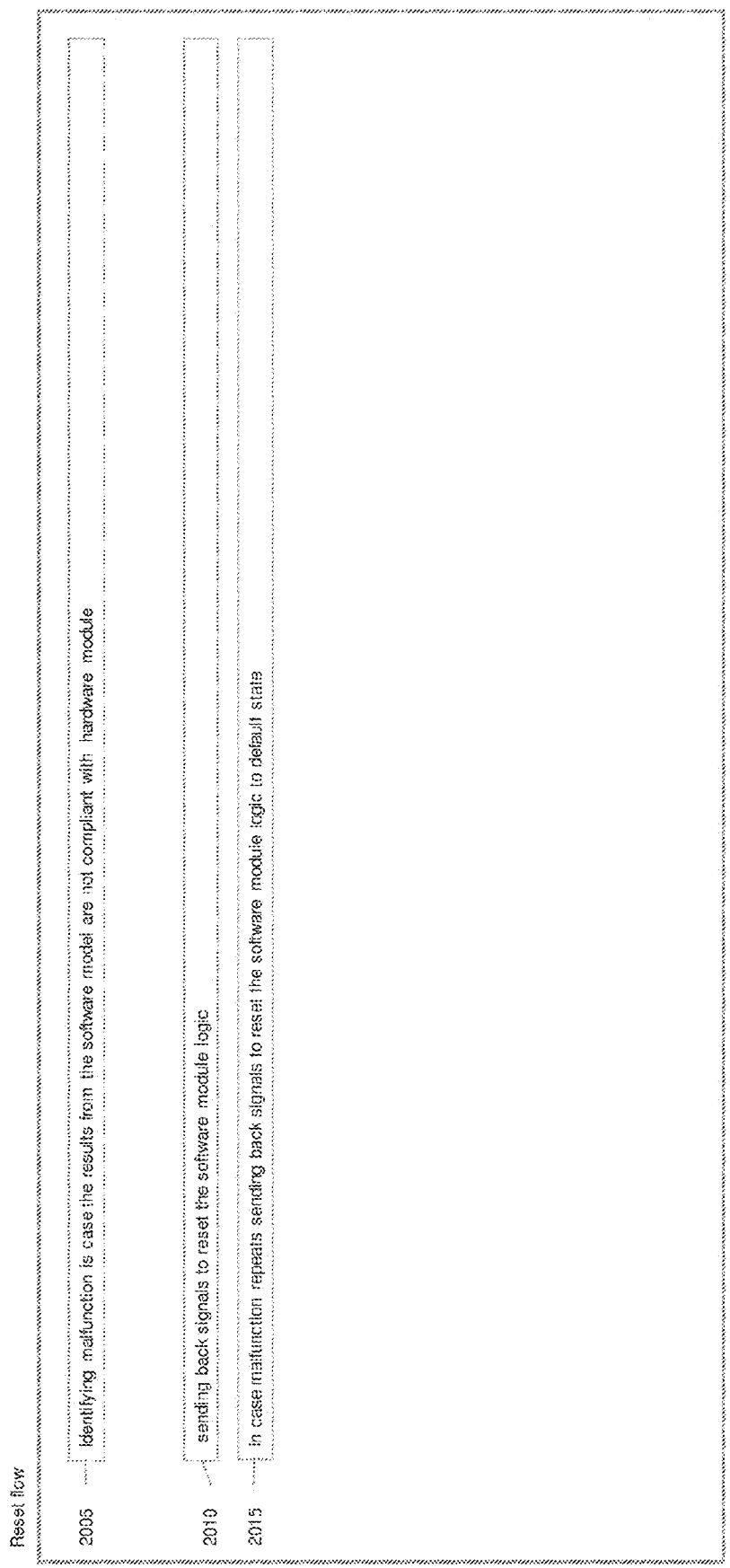
FIG. 7 presents a flow diagram, of the resetting process of, according to one embodiment of the present invention.

FIG. 7 presents a flow diagram, of the resetting process of, according to one embodiment of the present invention. The resetting process describes a mechanism in a closed loop scheme.

according the following steps:

Identifying malfunction is case the results from the software model are not compliant with hardware module; (2005) sending back signals to reset the software module logic; (2010)

In case malfunction repeats sending back signals to reset the software module logic to default state; (2015);

Reset of a microcontroller, does not change the state of internal memory, while in Reset state the unit is in minimum power consumption and reset to initial state. Optionally we can use Sleep Line. Sleep Line stopes/pause the process, and continue at any time from the stopping point (breakpoint). (I think this item can be deleted)

Figure 8:
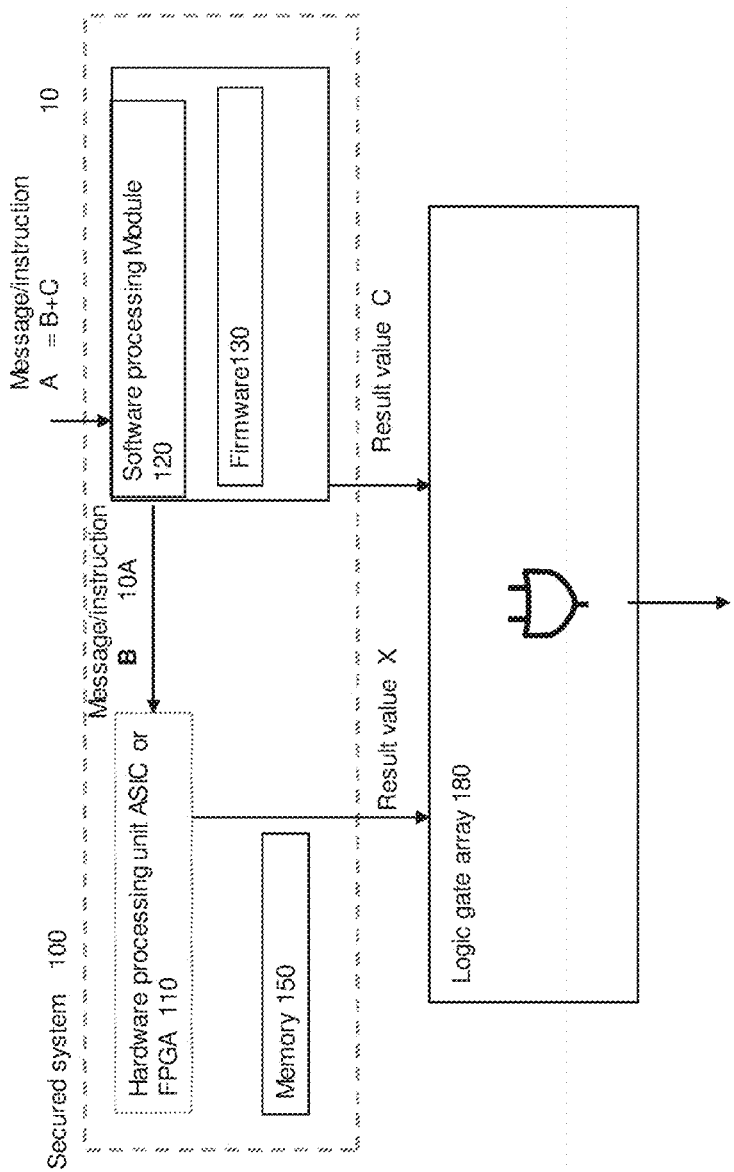
FIG. 8 presents a schematic block diagram and flow of the secured system including additional according to one embodiment of the present invention.

FIG. 8 presents a schematic block diagram and flow of the secured system including additional message part according to one embodiment of the present invention.

According to this embodiment an input message may include encrypted message and encrypted CRC (or HASH) of a plain message. Software Processing Unit sends encrypted message to Hardware Processing Unit. Processing Unit sends also encrypted CRC (or HASH) to Compare Logic Unit. Hardware Processing Unit decrypts encrypted message, calculates CRC (or HASH), encrypts it and sends encrypted CRC (or HASH) to Compare Logic Unit.

Figure 9:
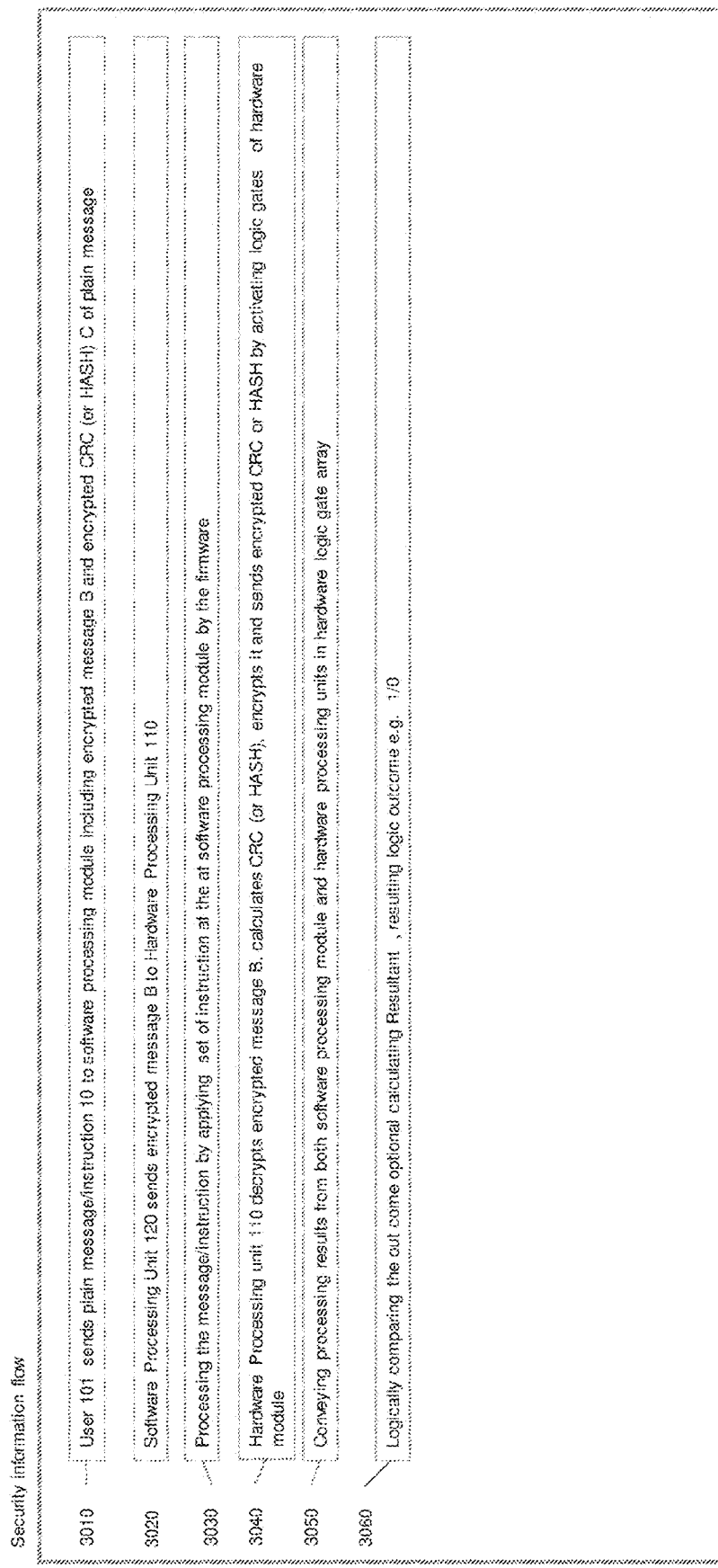
FIG. 9 presents a flow diagram, of the security process of security systems of FIG. 8, according to one embodiment of the present invention.

FIG. 9 presents a flow diagram, of the real time security process of security systems of FIG. 8, according to one embodiment of the present invention. The security process according to this embodiment includes the following steps:

The User 101 sends plain nonrandom message/instruction to software processing module including encrypted message B and encrypted CRC (or HASH) C of plain message. (3010).

The Software Processing Unit 120 sends encrypted message B to Hardware Processing Unit 110 (3020).

Real time Processing for validating the message/instruction by applying set of instructions at the at software processing module by the firmware (3030).

Real time Processing decrypts encrypted message B, calculates CRC (or HASH), encrypts it and sends encrypted CRC or HASH by activating logic gates of hardware module. (3030).

Conveying processing results from both software processing module and hardware processing units in hardware logic gate. (3040).

Logically comparing the outcome optional calculating Resultant, resulting logic outcome e.g. 1/0 (3050) for validating the message.

Figure 10:
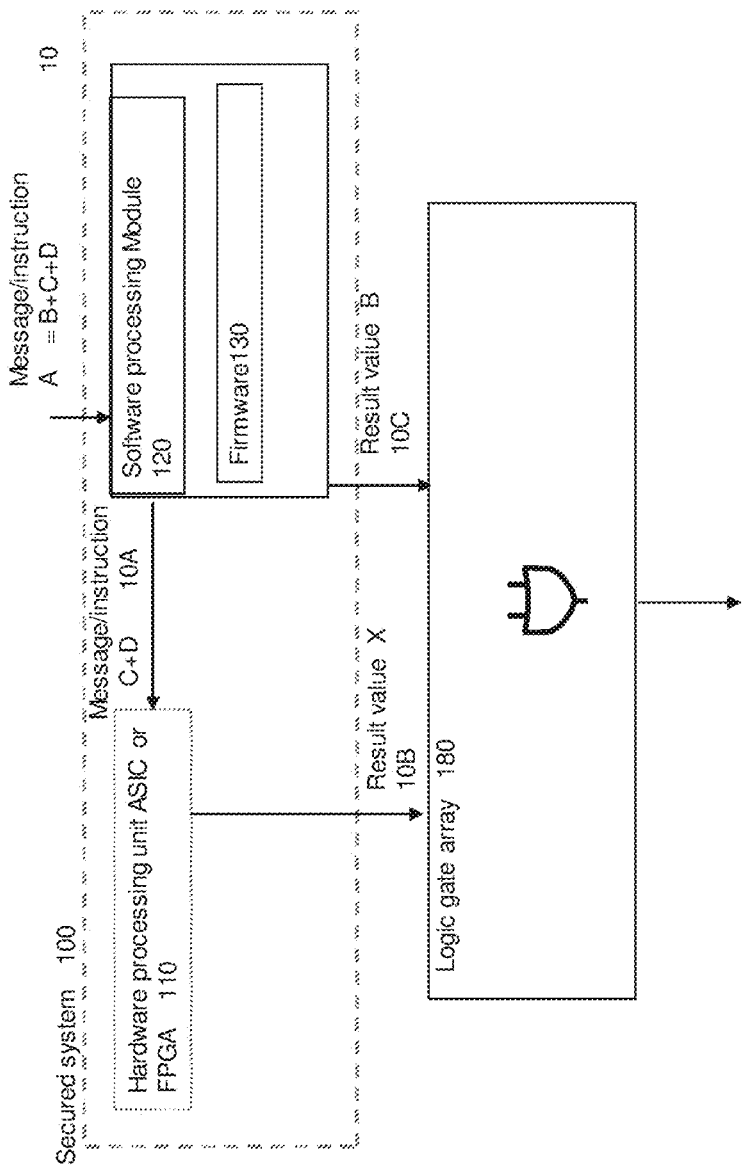
FIG. 10 presents a schematic block diagram and flow of the secured system including message splitting according to one embodiment of the present invention.

FIG. 10 presents a schematic block diagram and flow of the secured system including message splitting according to one embodiment of the present invention.

Hardware Processing Unit 110 can include Table of user's shared secrets in the security memory 150. In this case message 401 can include encrypted message 402, user's ID 405 and encrypted CRC (or HASH) 403 of plain message. Software Processing Unit 120 will send encrypted message 402 and user's ID 405 to Hardware Processing Unit 110. Hardware Processing Unit 110 will decrypt message 402 with corresponding user key and sends encrypted CRC (or HASH) 404 to Compare Logic Unit 108.

Components with different initialization stages. For example, ASIC (initialization on manufacturing stage) and microprocessor (initialization in operational stage) it may be implemented as two microprocessors. The first microprocessor with available remote update and the second microprocessor, only with local update.

Data processing in software (for example, microprocessor) and data processing in deterministic hardware components for example, logic gate. (Deterministic hardware component is same to application-specific hardware)

Corresponding presented structure protocol. The protocol defines program code of software unit, structure of hardware unit and structure of comparison unit.

Figure 11:
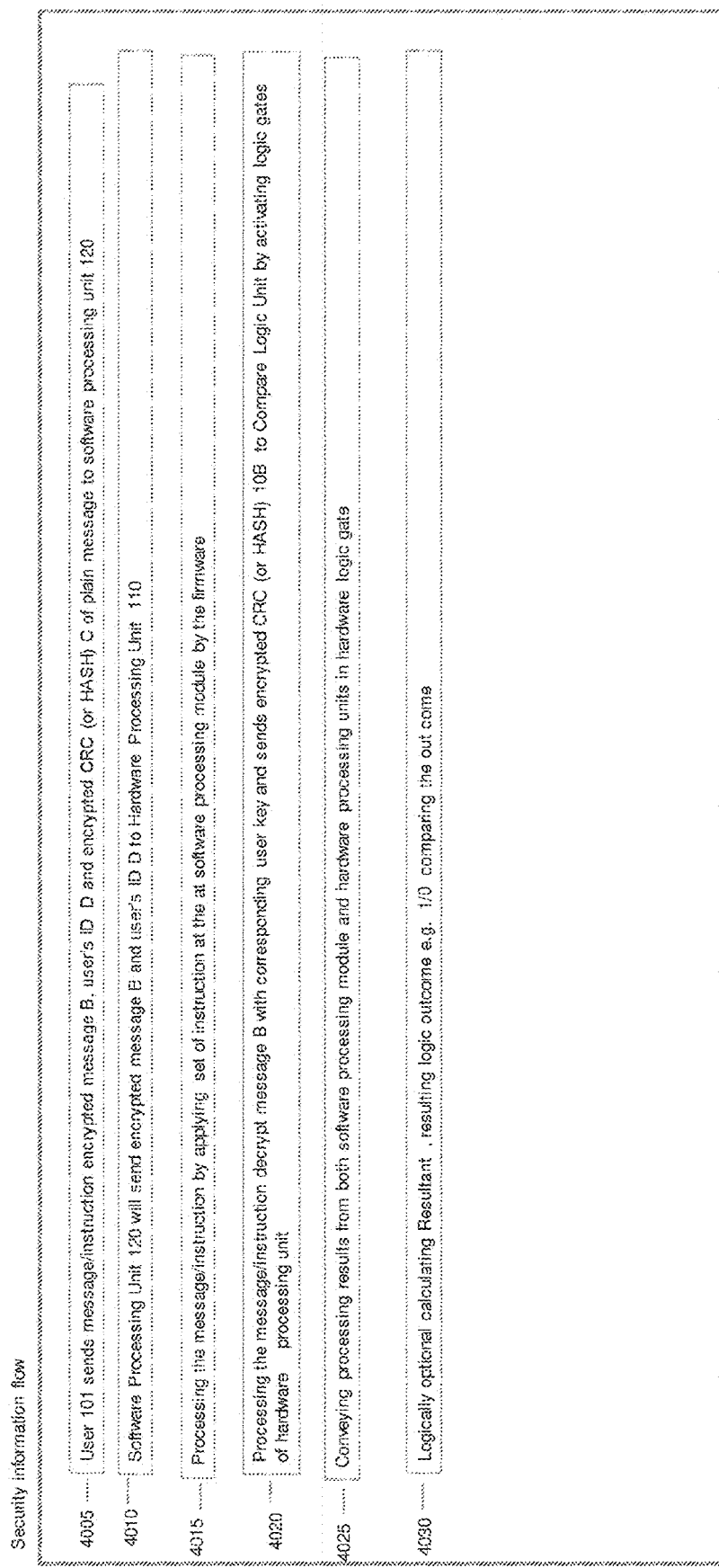
FIG. 11 presents a flow diagram, of the security process of security systems of FIG. 10, according to one embodiment of the present invention.

FIG. 11 presents a flow diagram, of the security process of security systems of FIG. 10, according to one embodiment of the present invention.

The security process according to this embodiment include the following steps:

User 101 message/instruction encrypted message B, user's ID 405 and encrypted CRC (or HASH) 403 of plain message. d to software processing (4005)

Software Processing Unit 120 will send encrypted message B and user's ID 405 to Hardware Processing Unit (4010)

Processing the message/instruction by applying set of instruction at the at software processing module by the firmware. (4015)

Processing the message/instruction decrypt message 402 with corresponding user key and sends encrypted CRC (or HASH) 404 to Compare Logic Unit by activating logic gates of hardware processing unit. (4020).

Conveying processing results from both software processing module and hardware processing units in hardware logic gate. (4025)

Logically optional calculating Resultant, resulting logic outcome e.g. 1/0 comparing the outcome. (4030)

Figure 12:
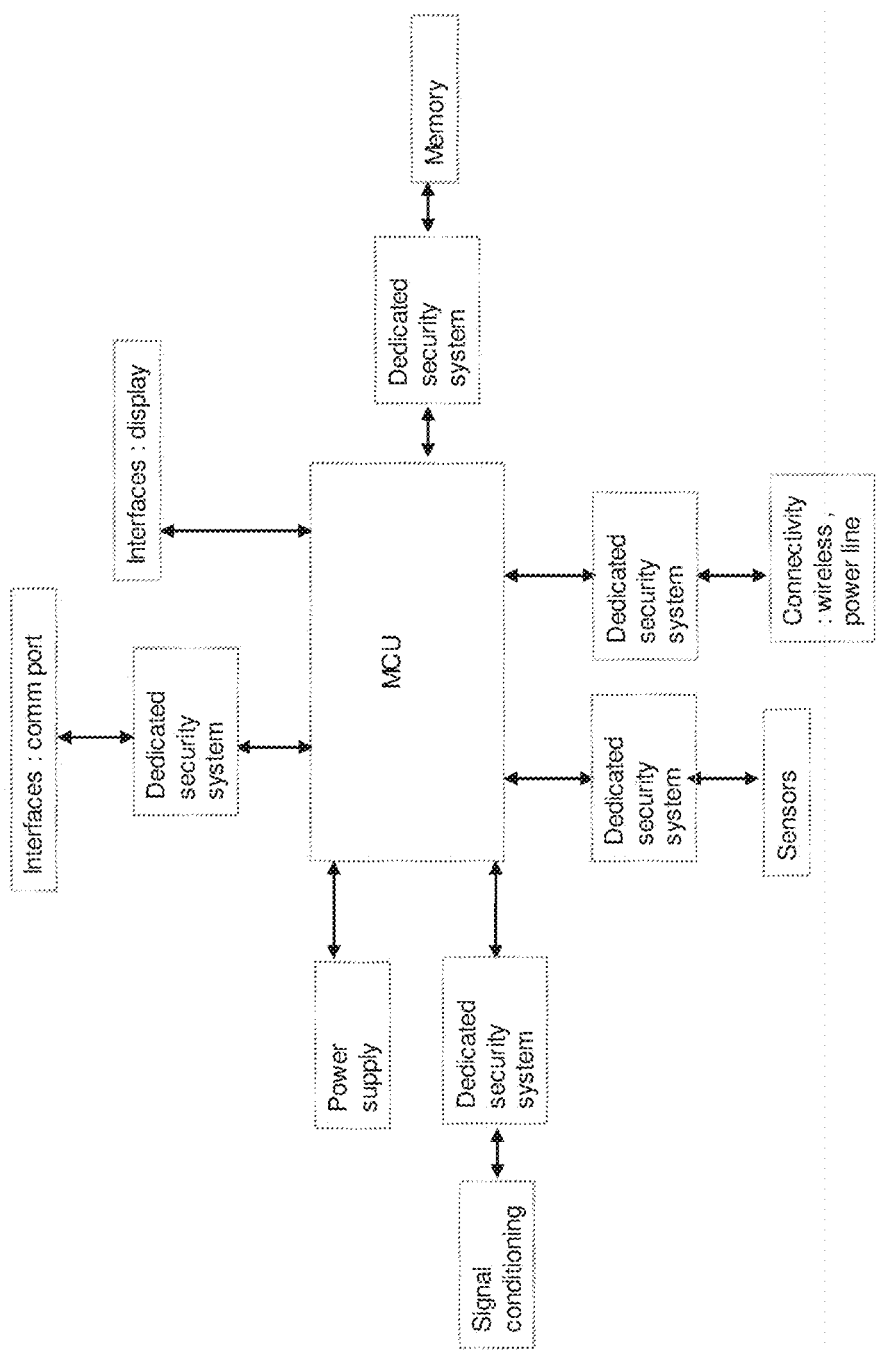
FIG. 12 presents a schematic block diagram illustrating an example of integrating the secured system within factory infrastructure according to one embodiment of the present invention.

FIG. 12 presents a schematic block diagram illustrating an example of integrating the secured system within factory infrastructure according to one embodiment of the present invention.

As seen in this figure, the security systems as described in various embodiments above can be integrated in communication line of factory infrastructures between, the media control unit (MCU) and the actuator, such as valve or pump, or between the MCU and memory unit. or MCU and signaling condition units.

FIG. 13 presents a schematic block diagram illustrating an example of integrating the secured system within factory infrastructure according to one embodiment of the present invention FIG. 14 presents a schematic block diagram illustrating an example of integrating the secured system within processing unit according to one embodiment of the present invention The output signal can be used as input signal in a switch, which control Data Line of processing unit. In this case, the system can be used for clipping unauthorized messages. We can change Data Line to Power Line. In this case, the system can completely shut off all resources, includes processor and memory.

FIG. 15 presents a schematic block diagram illustrating an example of integrating the secured system within processing unit as reset line, according to one embodiment of the present invention.

The output signal can be used as the input signal into Compare Logic unit which is located, for example, on the Reset Line.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Figure 16:
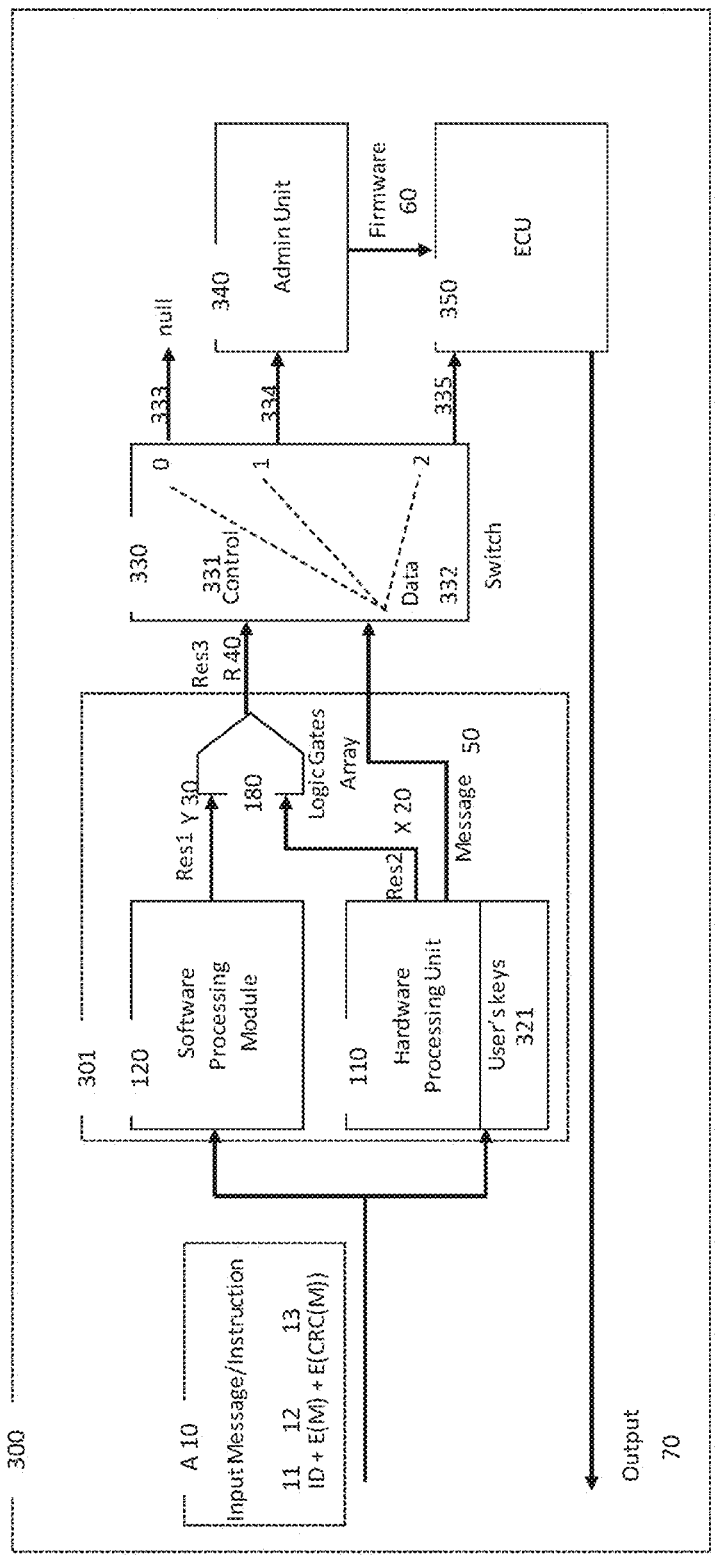
FIGS. 16, 17 and 18 the secured system disclose use case example, according to one embodiment of the present invention.
Figure 17:
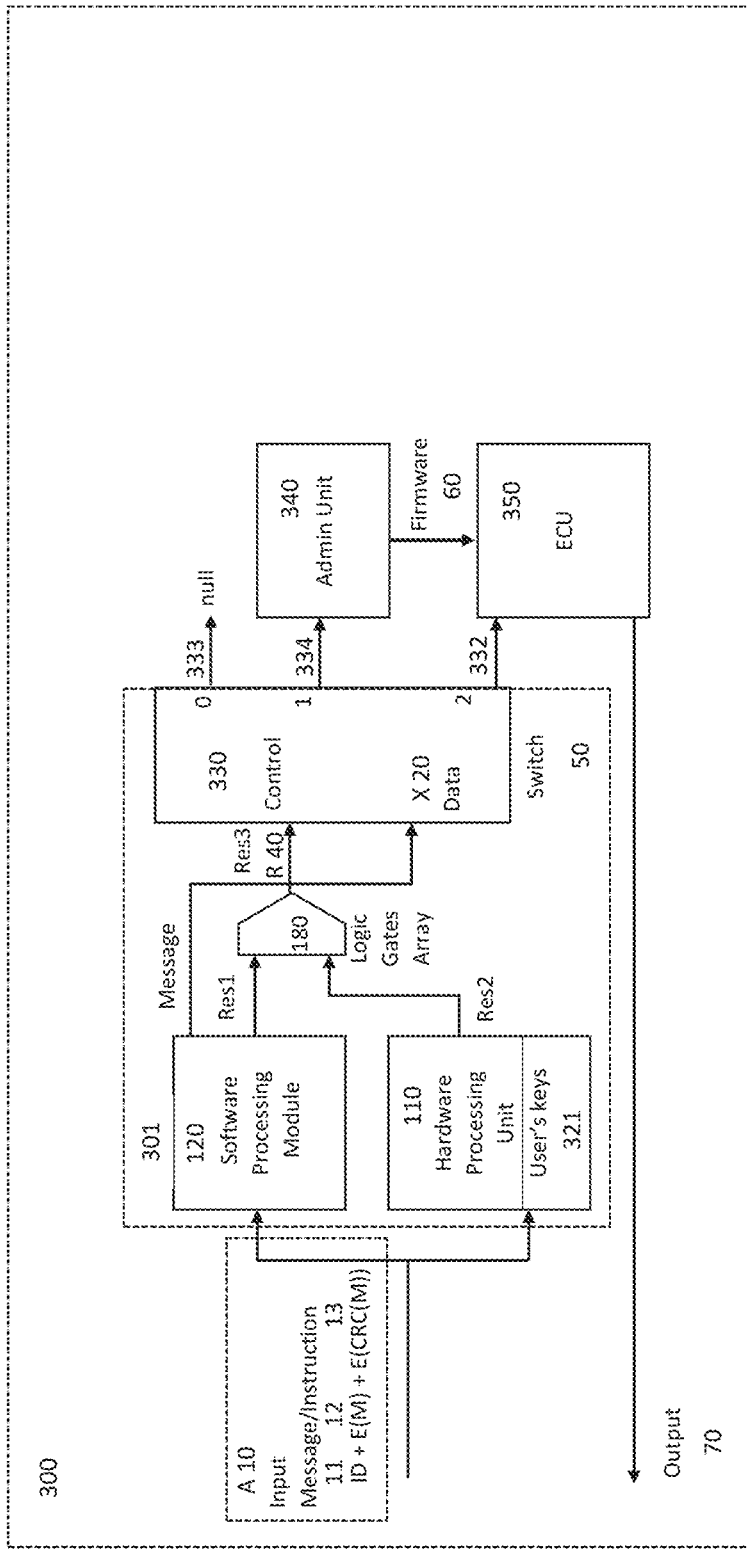
Figure 18:
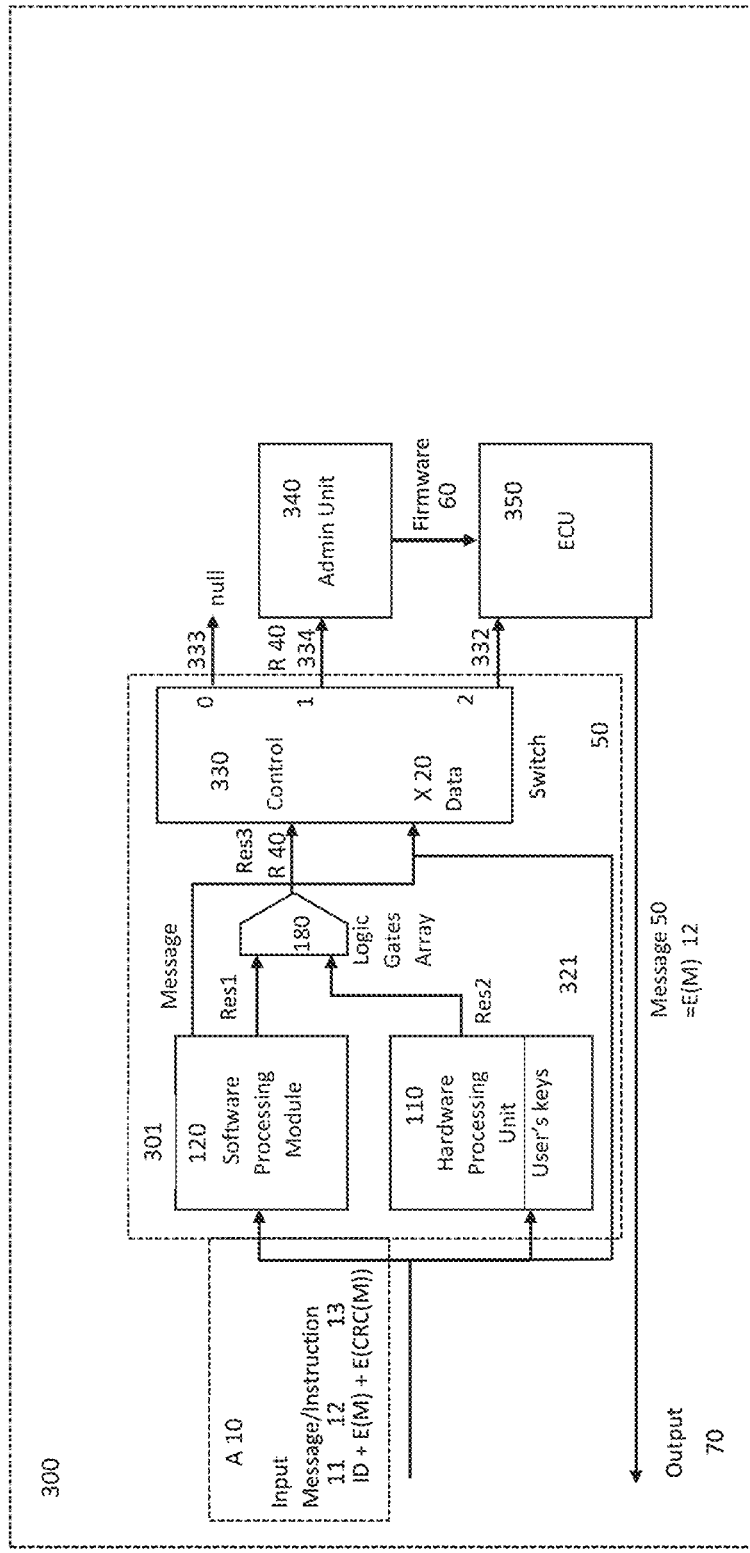

FIGS. 15, 16 and 17 disclose use case example—A system 300 comprising an ECU 350 and an administration control unit (Admin unit) 340, protected by the secured system 301 described in the invention. For the purpose of the example, we assume two types of data flows: Common commands and requests to the ECU and Administrative data such as ECU FW updates to the Admin unit.

Respectively, operational data will reach the system from authorized users with known ID and administrative data from authorized administrators with known ID. Additional data may reach the system due to communication errors or from malevolent attacks by hackers.

The function of the protection switch is to verify that authorized messages reach their corresponding addressee within the protected unit and that unauthorized messages will be blocked.

In this example we assume that messages from authorized parties will contain sender's ID. We further assume that user's decryption keys are stored in the HW unit & message decryption is thus performed by HW unit (FIG. 15), although in other embodiments this can be done by the SW unit as well (FIG. 16). In other embodiment the encrypted message 12 can be send directly from input A 10 to the switch 330 (FIG. 17).

The function and operational flow of the protection switch are described in the following table:

FIG. 15

| | |
|---|---|
| User sends message to ECU. Message comprises user ID, encrypted message, encrypted CRC. Prior to the ECU, the message reaches the protection switch described in the invention | User (101) sends message/instruction (A10) comprising (11)(12)(13) to SW processing module (120) and HW processing unit (110) simultaneously |

FIG. 15

| | |
|---|---|
| SW unit within the Switch sends the encrypted CRC to the logic gate | SW processing module (120) sends E(CRC)(13) and ID(11) as Res1(Y30) to logic gate array (180) |
| HW unit decrypts the message using a decryption key corresponding to sender ID and calculates a CRC for the decrypted message | HW processing unit (110) decrypts E(M)(12) using decryption key(321) corresponding to ID(11), calculates CRC to decrypted message and encrypts said CRC using same key(321). |
| WH unit sends a combination of the processing result and the sender ID to the logic gate for comparison | HW processing unit(110) sends said encrypted CRC and ID(11) as Res2(X20) to logic gate array (180) |
| The product of the HW unit is compared with the encrypted CRC sent by the SW unit in the logic gate | Logic gate array (180) compares Res1(Y30) and Res2(X20) |
| the logic gate sends the result of the comparison forward to the switch in a message which represents one of two possible cases: Match or Mismatch. | Logic gate array (180) sends Res3(R40) to switch (330) |
| In case of Match the massage will be the sender's ID or a representation of this ID | Res3(R40) = ID |
| In case of Mismatch the message will be any form of error message. | Res3(R40) = error equivalent(333) |
| The switch has two inputs:<br>Control line - from logic gate<br>Data line - from HW unit | Switch(330) has control input(331) and data input(332) |
| The switch has 3 connectors at its output, out of which only one can be connected at any given time. The connectors are:<br>1. Admin<br>2. User/ECU<br>3. null | Switch(330) has 3 possible switching positions - (333) for error, (334) for ADMIN ID and (335) for User ID |
| According to the type of control received from the logic gate (ID or error), the switch selects one of the connectors (1, 2, or 3) | If Res3(R40) = Admin ID position (334) is switched.<br>If Res3(R40) = User ID position (335) is switched.<br>If Res3(R40) = error ID position (333) is switched. |
| Once the switch is locked in its position according to the control received from the logic gate, the HW unit sends the message forward through the switch. | Switch (330) locked in one of (333), (334) or (335) positions.<br>HW processing unit (110) sends message (50) to Switch (330). Message (50) reaches either Admin unit (340) or ECU (350) if switch position is (334) or (335) respectively.<br>If switch position is(333) (= error state) message is blocked in the switch |
| In case of administrative data such as FW update, Admin Unit will perform FW update in ECU | Admin Unit(340) run firmware update(60) in ECU(350) |
| In case data is a command or request to the ECU, the ECU will perform an action and send output | ECU(350) perform action and sends output( ) |

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. Digital Signal Processor (DSP), Microcontrollers, Field Programmable Gate Array (FPGA), Application Specific Integrated Circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (Read Only Memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A system for authenticating and securing message/instruction transmission, system comprising:
    a communication split module for processing of an original input message from trusted or untrusted media, and transmitting the original input message and a derivative of said original input message simultaneously to an untrusted hardware processing unit and to an untrusted software processing unit;
    the untrusted hardware processing unit, for testing the validity of the transmitted original message or derivative of said original message by running specific firmware code resulting in first test results;
    the untrusted software processing unit, for testing the validity of the transmitted original message or derivative of said original message by running specific software code, for resulting in a second test result;
    a logic comparison module, for logically comparing between the first and the second test results identifying logic relation between the results, wherein said logic comparison authenticates said message;
    wherein the testing is performed simultaneously at the untrusted hardware processing unit and the untrusted software processing unit.

2. The system of claim 1, wherein said logic comparison module is implemented as a hardware module comprising a gates array including at least one logic gate.

3. The system of claim 1, wherein said logic comparison module is implemented as a processing unit.

4. The system of claim 1, wherein the hardware processing unit includes a firmware and a memory, wherein the hardware processing is executed based on instructions in the firmware and memory modules.

5. The system of claim 1, wherein the original message is split into two different messages, wherein a first message is directed to software processing unit and a second message is directed to the hardware processing unit.

6. The system of claim 1, wherein the hardware processing unit is implemented as Application-Specific hardware.

7. The system of claim 1 further comprising a second logic comparison hardware module, for receiving the outcome of the first logic comparison module and sending feedback to the software processing unit, wherein the feedback enables resetting operation on the software processing unit.

8. The system of claim 1, wherein security elements are initialized and activated at different stages of design, manufacture and execution, wherein non-configurable hardware element remains unchanged throughout the life circle after design and manufacture and software element, also, can be initialized on different operation stages.

9. The system of claim 1 wherein the initialization of the hardware processing unit is performed only on manufacturing stage.

10. The system of claim 1 wherein the initialization of the hardware processing unit is performed only in the operation stage.

11. The system of claim 1 wherein the testing at the hardware module and software modules are performed in real time.

12. The system of claim 1, wherein the split module sends same messages to the software processing unit and to the hardware processing unit simultaneously.

13. A system for authenticating and securing message/instruction transmission, system comprising:
- a hardware processing unit, for testing the validity of an original message or derivative of said original message by running specific firmware code resulting first test results;
- a software processing unit, for testing the validity of the original message or derivative of said original message by running specific software code, for resulting a second test result;
- a logic comparison module, for logically comparing between the first and the second test results identifying logic relation between the results, wherein said logic comparison authenticates said message;
- wherein the testing is performed simultaneously at the hardware processing unit and the software processing unit;
- wherein the message to the software processing module includes an encrypted message B and encrypted CRC or HASH C of a plain original message and the Software Processing Unit sends the encrypted message B to the Hardware Processing Unit where the Software Processing Unit sends also encrypted CRC or HASH to the logic comparison module, wherein said Hardware Processing unit calculates encrypted CRC or HASH X by the encrypted message B and by applying set of instructions and sends result value X to the logic comparison module.

14. A system for authenticating and securing message/instruction transmission, system comprising:
- a communication split module for processing of an original input message from trusted or untrusted media, and transmitting the original input message or a derivative of said original input message simultaneously to the untrusted hardware processing unit and to the untrusted software processing unit;
- the untrusted hardware processing unit, for testing the validity of the transmitted original message or derivative of said original message by running specific firmware code resulting in first test results;
- the untrusted software processing unit, for testing the validity of the transmitted original message or derivative of said original message by running specific software code, for resulting in a second test result;
- wherein both hardware processing unit software processing unit receive the same transmitted message;
- wherein the specific firmware code is different from the specific software code;
- a logic comparison module, for logically comparing between the first and the second test results identifying logic relation between the results, wherein said logic comparison authenticates said message;
- wherein the testing is performed simultaneously at the untrusted hardware processing unit and the untrusted software processing unit.

* * * * *